US010363180B2

(12) United States Patent
Bucher et al.

(10) Patent No.: US 10,363,180 B2
(45) Date of Patent: Jul. 30, 2019

(54) SUPPORT ASSEMBLY WITH SELECTIVE ORBITAL ROTATION ABOUT BRACKET

(71) Applicant: Adaptive Engineering Lab, Inc., Milwaukee, WI (US)

(72) Inventors: Ronald S. Bucher, Wauwatosa, WI (US); Adam Wied, Milwaukee, WI (US); Erik B. Holstad, Fredonia, WI (US)

(73) Assignee: Adaptive Engineering Lab, Inc., Milwaukee, WI (US)

( * ) Notice: Subject to any disclaimer, the term of this patent is extended or adjusted under 35 U.S.C. 154(b) by 442 days.

(21) Appl. No.: 15/216,324

(22) Filed: Jul. 21, 2016

(65) Prior Publication Data

US 2018/0021194 A1 Jan. 25, 2018

(51) Int. Cl.
*A61G 5/12* (2006.01)

(52) U.S. Cl.
CPC .......... *A61G 5/127* (2016.11); *A61G 2203/78* (2013.01)

(58) Field of Classification Search
CPC .......... A61G 5/12; A61G 5/125; A61G 5/127; A61G 5/128; A61G 15/10; A61G 15/105; A61G 15/12; A61G 1/04; A61G 1/056; A61G 2203/78; A61G 2203/80
See application file for complete search history.

(56) References Cited

U.S. PATENT DOCUMENTS

| 473,919 | A | 5/1892 | Edsall |
| 4,288,123 | A | 9/1981 | Cone |
| 5,123,768 | A | 6/1992 | Franklin |
| 5,678,798 | A | 10/1997 | Little |
| 5,964,439 | A * | 10/1999 | Johnson ................... A61G 5/10 248/278.1 |
| 6,361,118 | B1 | 3/2002 | Melgarejo et al. |
| 8,573,549 | B2 | 11/2013 | Holstad |
| 2006/0091706 | A1 * | 5/2006 | Christofferson ..... A61G 5/1067 297/130 |

* cited by examiner

*Primary Examiner* — Kari K Rodriquez
(74) *Attorney, Agent, or Firm* — Quarles & Brady LLP (57) ABSTRACT

A support assembly includes a fixable portion and a rotatable portion. The fixable portion is adapted to be fixedly mounted to a wheelchair and includes a shaft having a keyway formed therein that is supported by one or more mounts. The rotatable portion is received on the shaft and is in selective locked engagement therewith. The rotatable portion includes a bracket body with an opening into which the shaft of the fixable portion is received and a key member providing a key. The key member is supported by the bracket body and is movable in linear translation between an engaged position in which the key is engaged with the keyway to lock a rotational orientation of the bracket body relative to the shaft and a disengaged position in which the key is disengaged from the keyway permitting the rotatable portion to rotate relative to the fixable portion.

18 Claims, 7 Drawing Sheets

SUPPORT ASSEMBLY WITH SELECTIVE ORBITAL ROTATION ABOUT BRACKET

CROSS-REFERENCE TO RELATED APPLICATIONS

Not applicable.

STATEMENT OF FEDERALLY SPONSORED RESEARCH OR DEVELOPMENT

Not applicable.

FIELD OF INVENTION

This disclosure relates to a support assembly enabling selective orbital rotation of a support or pad about a bracket.

BACKGROUND

Wheelchairs are commonly used by people who are unable to walk. The typical wheelchair has a tubular metal frame with large rear wheels at each side and smaller front wheels which swivel. The frame is formed by a combination of elements, commonly referred to as "canes" that are connected together at various angles. In its simplest form, the seat of the wheelchair comprises a sheet of material which is hung between two spaced apart horizontal canes and a similar vertical sheet of material that is strung between two vertical rear canes to form the seat back. The wheelchair frame also has a pair of left and right hanger canes that extend downward and forward from the two horizontal seat canes and terminate in supports for the wheelchair occupant's feet.

Some wheelchair occupants lack sufficient leg muscle control to retain their legs in the proper position when seated. As a consequence, the occupant's legs often flop outward and, with the knees spread part in this manner, the occupant may slide forward in the chair.

For such people, lateral knee supports or knee adductors are frequently attached to the left and right hanger canes to restrain the legs from spreading apart and to maintain the person in the proper seated position in the wheelchair. A skilled medical person often initially positions the knee pads to provide adequate restraint and to also be comfortable to the wheelchair occupant.

Nevertheless, in some situations, the knee supports can interfere with the ability of the person to enter and leave the wheelchair and the supports may have to be removed or at least moved outward at those times. Thereafter, the knee supports usually have to be properly repositioned by a skilled medical person. In many situations, however, skilled medical personnel are not available, such as when the wheelchair is being used at home or elsewhere away from a medical facility. On those occasions, an unskilled caregiver assisting the wheelchair occupant may not restore the knee supports to the proper position or might even forget to reattach them to the chair. Other types of supports, such as for the head of the wheelchair occupant, also have similar adjustment requirements.

One potential bracket solving these problems is disclosed in U.S. Pat. No. 8,573,549 to Adaptive Engineering Lab, Inc. and is incorporated herein by reference for all purposes. In U.S. Pat. No. 8,573,549, a multi-part bracket is disclosed in which two bracket halves may be temporarily separated from one another, but remain in loose connection with one another via a central linkage. The separation of the bracket halves enables a support pad attached to one of the halves to be temporarily swung freely away from the other bracket half which is mounted to the chair. However, the bracket also accommodates the precise repositioning of the support to its original position and configuration upon the re-engagement and fixture of the bracket halves directly to one another.

SUMMARY OF THE INVENTION

Many of the repositionable support assemblies known in the art may require the use of multiple hands to operate. Such designs may be awkward to use, for example, when a caregiver needs one hand to support a body part of the individual in the wheelchair, as this leaves only a single available hand to adjust the support assembly. Similarly, if the occupant of the wheelchair is operating the support assembly him or herself, then use of only one hand may be available or it may be difficult to reach across the chair to have both hands reach the support assembly. Accordingly, there remains a need for a support assembly that may be temporarily repositioned using only a single hand.

Disclosed herein is a structure for a support assembly such as, for example, a knee adductor. This support assembly may be fixedly mounted to a wheelchair and may be pre-configured in a variety of fixed configurations in which the support pad is uniquely positioned relative to a bracket body which is attached to the chair. However, when a user or caregiver needs to temporarily reposition the support pad to provide clearance for movement (such as during the action of seating or unseating the occupant of the wheelchair), the support assembly permits for the pad and any associated arm to be temporarily swung out of the way and then precisely returned to its original position at a later time. Among other things, the structure disclosed herein may provide one-handed release and rotation while still permitting a return to the originally selected pre-configured fixed configuration.

According to one aspect, a support assembly for a wheelchair is disclosed. This support assembly may be used in a variety of contexts, but may be, at least in some forms, a knee adductor. The support assembly includes a fixable portion and a rotatable portion. The fixable portion is adapted to be fixedly mounted to the wheelchair and includes one or more mounts adapted to be mounted to the wheelchair. The fixable portion further includes a shaft having a keyway formed therein in which the shaft is supportable by the mount(s) (that is to say, the shaft is supported—directly or indirectly—by the one or more mounts when the mounts are attached to a wheelchair). The rotatable portion is received on the shaft of the fixable portion and is in selective locked engagement with the shaft. The rotatable portion includes a bracket body defining an opening into which the shaft of the fixable portion is received and further includes a key member providing a key. The key member is supported by the bracket body and is movable in linear translation between an engaged position and a disengaged position. In the engaged position, the key is engaged with (or received in) the keyway in the shaft to lock an orientation of the bracket body of the rotatable portion relative to the shaft of the fixable portion. In the disengaged position, the key is disengaged from (or not received in) the keyway in the shaft to permit the rotatable portion to rotate relative to the fixable portion about an axis of rotation defined by the shaft.

In some forms, in the disengaged position in which the key is disengaged from the keyway in the shaft to permit the rotatable portion to rotate relative to the fixable portion about an axis of rotation defined by the shaft, the bracket body may be rotatable about a single plane of rotation which is perpendicular to the axis of rotation defined by the shaft of the fixable portion.

In some forms, the bracket body may include a cavity extending from one side to the other side of the bracket body and the key member may be received in this cavity. The cavity of the bracket body may be in communication with the opening in the bracket body in which the shaft is received such that the key of the key member is engageable with the keyway in the shaft in at least one orientation of the rotatable portion relative to the fixable portion. The rotatable portion may further include a post connected to the key member, a biasing element that is interposed between the post and the bracket body to bias the key member to the engaged position, and a depressible button connected to the bracket body that is positioned to contact the post and, upon depression of the depressible button, overcome the biasing force of the biasing element to move the key member to the disengaged position. It is contemplated that an underside of the depressible button may have a recess formed in it and that this recess may be adapted for contact with a head of the post upon depression of the button. The recess in the underside of the depressible button may include a contacting surface that is oblique to the central axis of the post. Among other things, by establishing an oblique surface that engages the post, the post may be less likely to stick within the cavity as it translates with the key member.

In some forms, the key may be rectangular in shape. By taking this rectangular shape, as opposed to other shapes having curved surfaces or gradual edges, the key may be more likely to register a clicking noise or tactile snap when the key suddenly locks into the keyway to alert the user that the support assembly is back in the locked position.

In some forms, the key member may be linearly translatable within the cavity of the bracket body between the engaged position and the disengaged position with the cavity. The cavity may have at least a portion thereof that is shaped to be adapted to define a path of linear translation of the key member in the cavity. The key member may have a rectangular periphery and the cavity may have a portion with a corresponding rectangular periphery for reception of the key member and defining the pathway between the engaged and disengaged positions. The corresponding rectangular periphery in the cavity may further include cutout sections at each of the corner edges of the corresponding rectangular periphery to provide dimensional relief and inhibit binding of the key member in the cavity during travel of the key member. Put another way, the edges of the rectangle on the cavity may have volumes immediately around the edges removed. This may help to prevent the key member from sticking or binding if it becomes angularly cocked as it linearly translates within the cavity.

In some forms, the key may extend from the key member in a direction opposite to a direction of movement from the engaged position of the key member to the disengaged position of the key member. In this way, when the depressible button is depressed, it may cause the key member to move such that the key is withdrawn from the keyway in the shaft.

In some forms, the fixable portion may further include a link to which the mount(s) is/are attached and may further include a stem which is attached to the link in which the stem provides, at least in part, the shaft and the keyway. In some forms, the stem and the link may each include a respective serrated face that mate with one another to define a plurality of pre-defined angular orientations of the stem and the keyway relative to the link. It is contemplated that, in some forms, the serrated face on the stem may be positioned on an axial end of the stem. In this way and via adjustment, the keyway may take various angular orientations relative to the link, even once the fixable portion is fixed relative to a wheelchair via the mount(s). Moreover, this adjustability of the orientation of the keyway relative to the stem and mounting portions may enable the support assembly (or, more specifically, the link) to be mounted in any one of a number of orientations and the orientation of the stem may be subsequently adjusted based on the usage conditions to obtain the desired orientation of the keyway.

It is also contemplated that, in some forms, the fixable portion may further include a threaded insert press fit into an opening of the link in which the opening is centrally disposed relative to an annular serrated face on the link.

In the instance of a separate stem and link, the fixable portion may further include at least one fastener element that secures the stem to the link. For example, the fastener element(s) may prevent the serrations of the stem from disengaging the link.

In some forms, the bracket body may further include a support opening for fixed reception of a pad subassembly in the bracket body. In such case, the bracket body may contain a split section adjacent to the support opening in which the split section has two sections or halves that may be drawn together using a fastening element to selectively reduce a size of the support opening to clamp a portion of a pad subassembly therein (for example, the support opening may capture an arm therein via a clamping action by moving the two halves closer together). The support assembly may further include a pad subassembly having an arm sized to be received in the support opening on one end of the arm and a pad supported on the other end of the arm (in which the pad may be positioned to, for example, support the side of a knee or leg).

In some forms, a radially outward facing surface of the shaft of the fixable portion may bear directly on a radially inward facing surface of the opening of the bracket body of the rotatable portion into which the shaft is received. This bearing configuration may define the orbital rotation of the rotatable portion relative to the fixable portion of the support assembly.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION

Figure 1A:
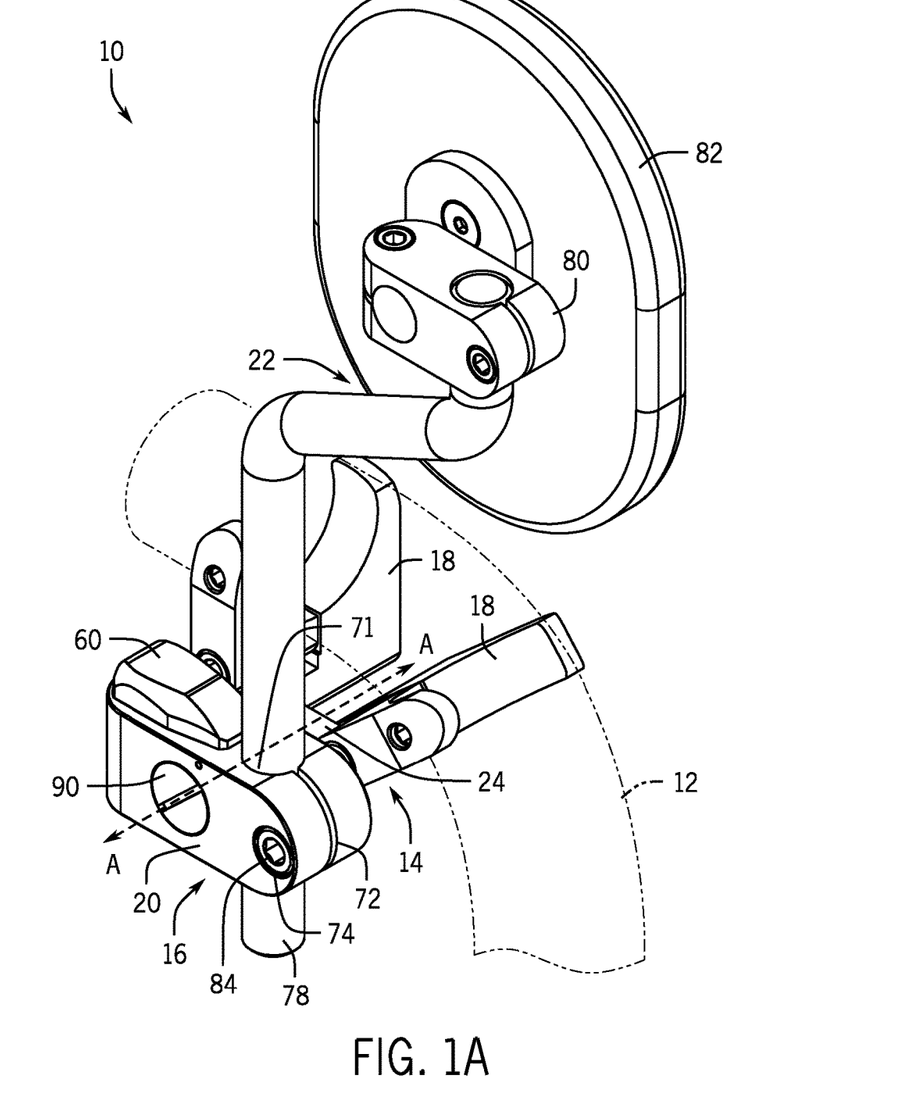
FIG. 1A is an environmental perspective view of the support assembly mounted to a cane of a wheelchair in which the support assembly is in a locked position.
Figure 1B:
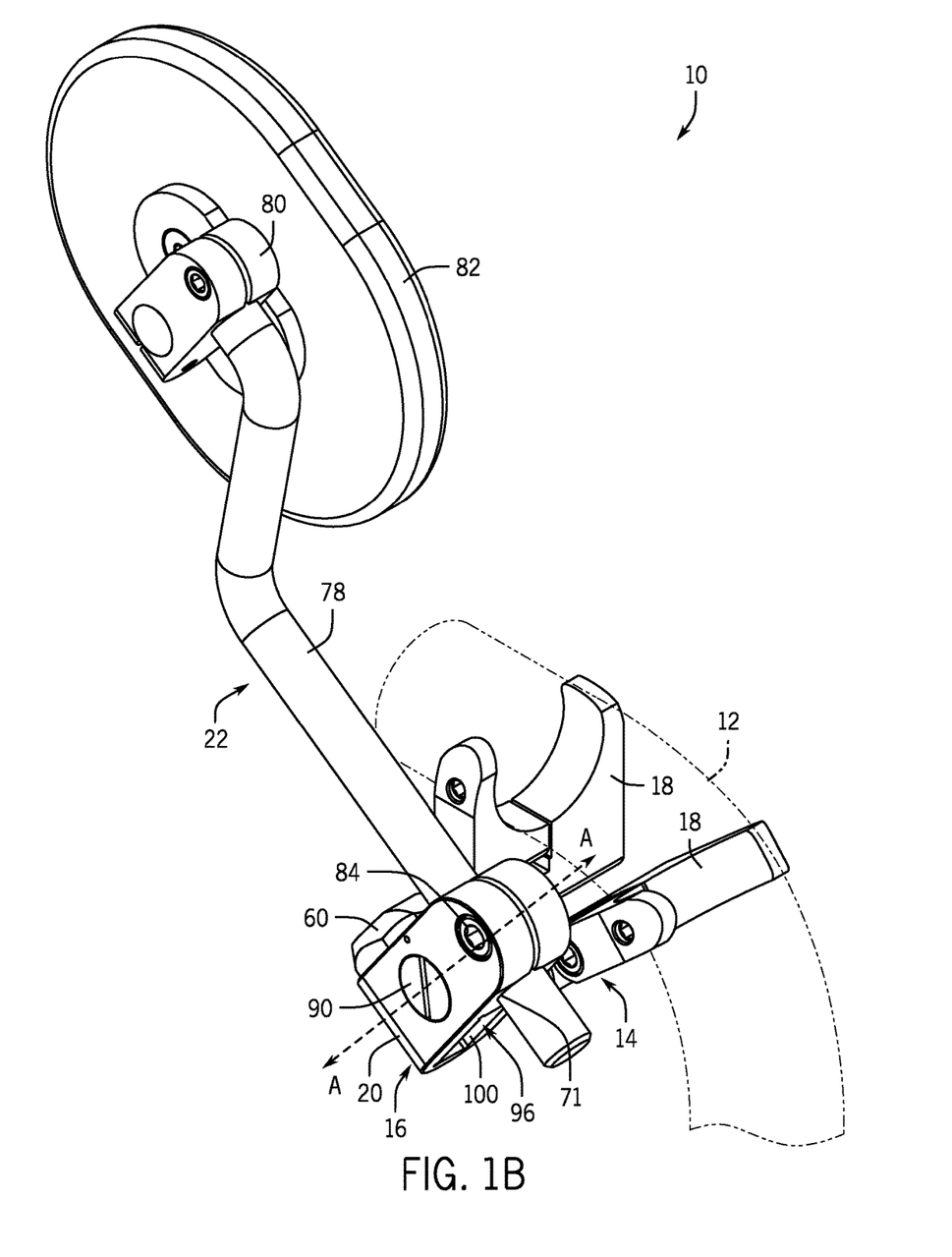
FIG. 1B is an environmental perspective view of the support assembly of FIG. 1A in which the rotatable portion of the support assembly has been rotated in plane about the fixable portion to temporarily move the support pad.

Looking first at FIGS. 1A and 1B, a support assembly 10 is illustrated. In the form illustrated, the support assembly 10 is a knee adductor for mounting to a cane 12 of a wheelchair; however, the structure of the support assembly 10 described herein may be widely used in other types of supports for wheelchairs or other devices.

The support assembly 10 generally includes a fixable portion 14 and a rotatable portion 16. The term "fixable" is used to denote that the portion is capable of being fixed relative to something, such as a cane of the wheelchair. Once the fixable portion 14 is fixed, it is no longer movable relative to the object it is fixed on. In contrast, the term "rotatable" is used to denote that, when the fixable portion 14 is fixed, the rotatable portion 16 can still be rotated relative to the fixable portion 14 under at least certain conditions. The rotatable portion 16 might be selectively rotationally locked with respect to the fixable portion 14, but is capable—under at least certain conditions—of being rotated relative to the fixable portion 14.

As illustrated, the fixable portion 14 of the support assembly 10 is attached to the cane 12 of the wheelchair using one or more mounts 18. Although the mounts 18 are pivotal clamp mounts as shown in the illustrated embodiment, it will be appreciated that other types of mounting systems may also be used (for example, track mounts having a slot or tongue that is slideably received in a groove). Although two mounts are shown in the illustrated embodiment, one, two, or more mounts may be used to attach the fixable portion 14 of the support assembly 10 to a wheelchair.

The rotatable portion 16 is received on the fixable portion 14 and is rotatable thereabout on a rotational axis A-A. Upon rotation, a bracket body 20 (along with the internal components of the bracket body 20, further described below) and the pad subassembly 22 supported therein rotates about the axis A-A as can be seen between the "locked" position of FIG. 1A and an exemplary one of a number of possible rotating positions illustrated FIG. 1B in which the pad subassembly has been orbitally-rotated from its original position about the axis A-A.

Figure 2A:
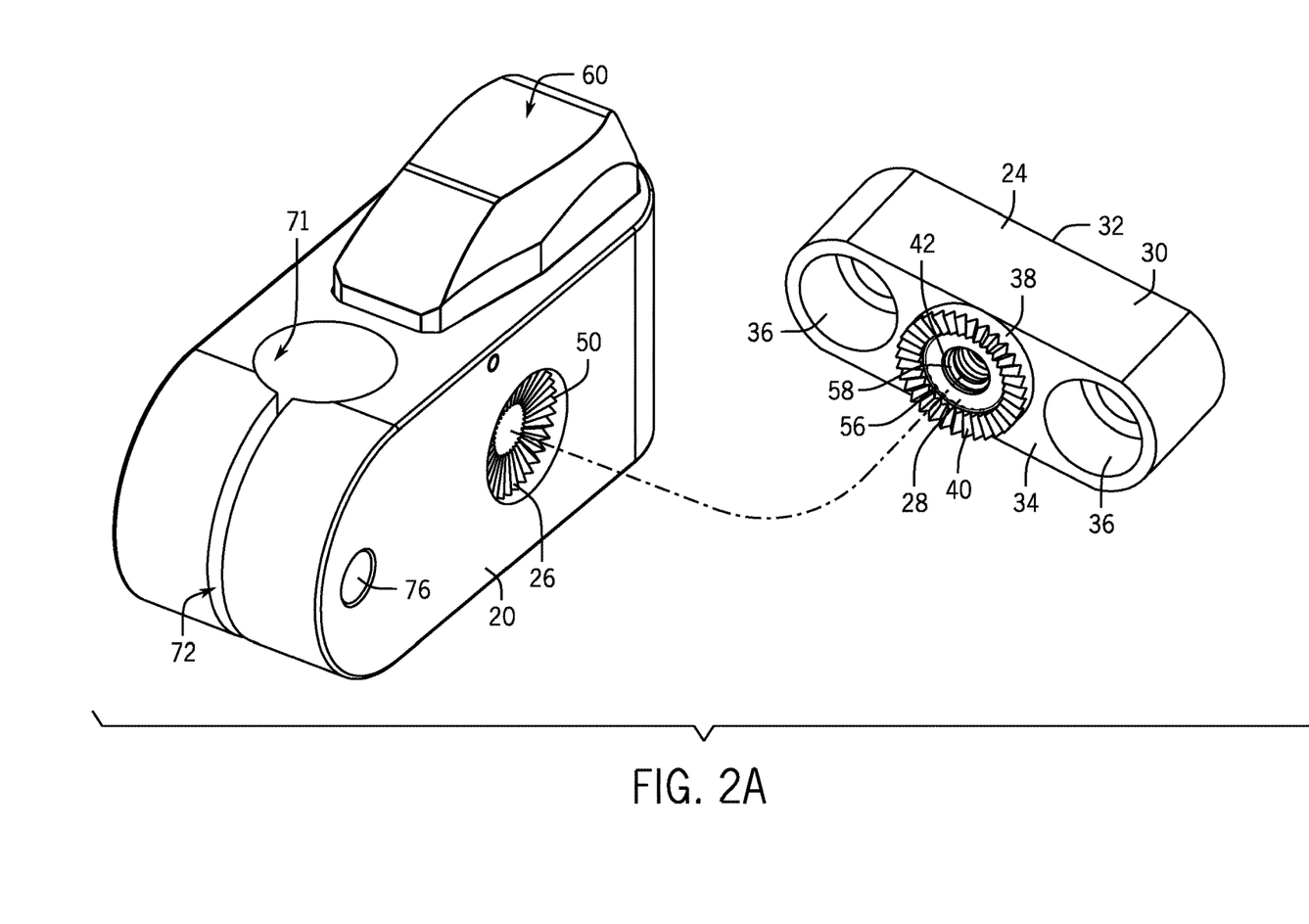
FIG. 2A is a detailed exploded book view of a portion of the support assembly without the mounts or the pad subassembly, illustrating the serrated connections between the link and the stem of the fixable portion.
Figure 2B:
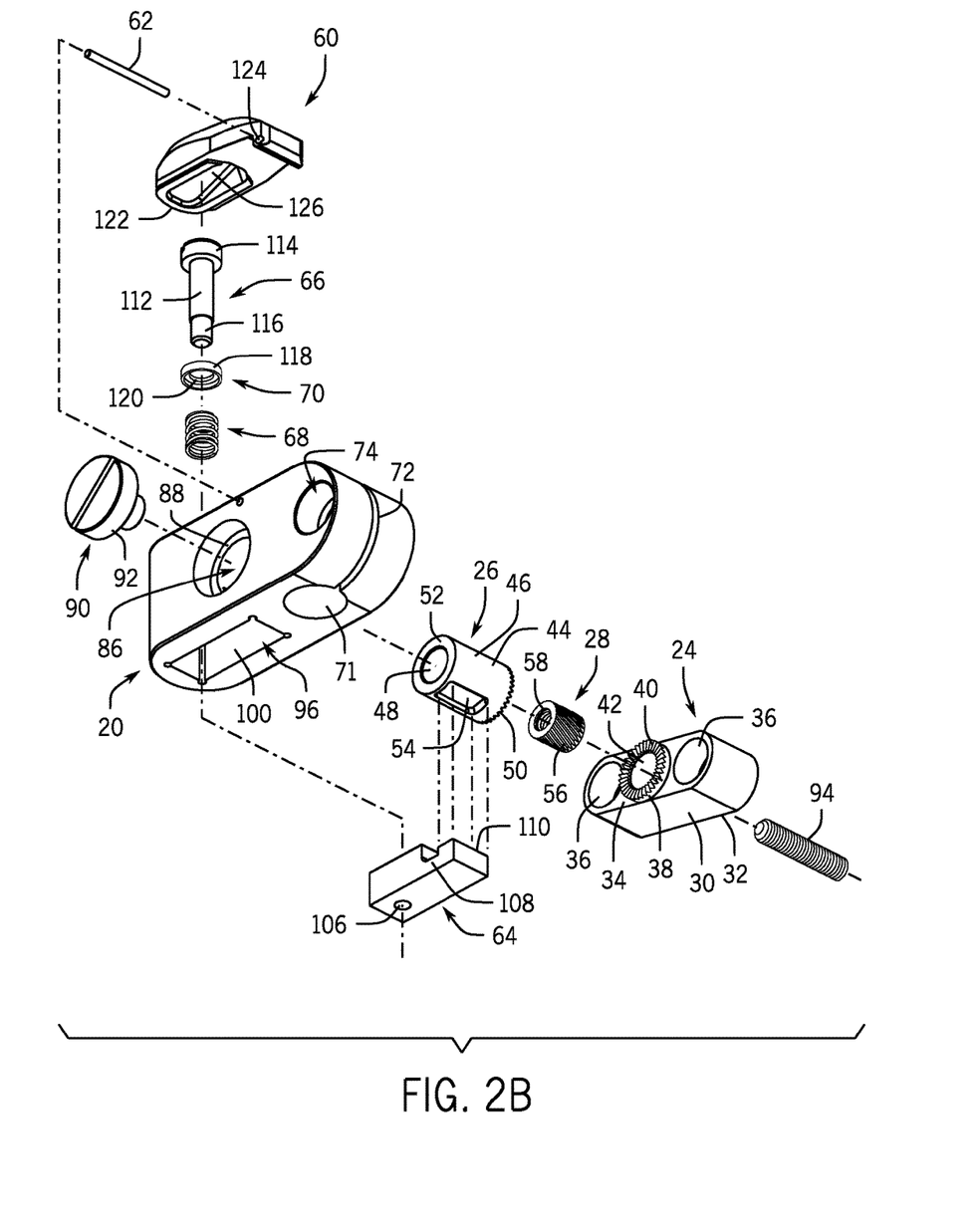
FIG. 2B is a more completely exploded view of the portion of the support assembly of FIG. 2A illustrating the various components of the support assembly separately.

Turning now to FIGS. 2A and 2B, a detailed view is provided of some of the various components of the support assembly 10 that enable this rotation. For the sake of clarity, the pad subassembly 22 is omitted from these views.

The fixable portion 14 includes various components including the aforementioned mounts 18 (which are not illustrated in FIGS. 2A and 2B), a link 24, a stem 26, and a threaded insert 28.

Looking at the link 24, the link 24 has a generally elongated body 30. The body 30 has a mount-facing side 32 and a rotatable portion-facing side 34. In the exemplary form illustrated, openings 36 extend between the sides 32 and 34 in order to provide a location to secure the mounts 18 which are positioned on the mount-facing side 32. Bolts or other fasteners may be received in these openings 36 in order to support or lock the bolts in place relative to the link 24. On the rotatable portion-facing side 34 of the body 30 of the link 24, there is also a generally annular protrusion 38 which includes a serrated axial face 40 with generally radially extending serrations. In a central portion of the generally annular protrusion 38, there can be an opening 42 for reception of fastening elements and/or the interconnecting tube 28. It is contemplated that the opening 42 may have threads and/or helical serrations in order to lock and fix the link 24 to the stem 26.

Looking now at the stem 26, the stem 26 includes a generally tubular cylindrical body 44. The tubular cylindrical body 44 has a radially outward facing surface 46, a radially inward facing surface 48 (which may includes helical serrations and/or threads), and opposing axial faces including a serrated axial face 50 and a non-serrated axial face 52. On the radially outward facing surface 46, there is a keyway 54. As illustrated, the keyway 54 is generally rectangular, recessed into the body 44, and extends over an axial length of the stem 26.

Notably, the serrated axial face 50 of the stem 26 is shaped and sized to mate with the serrated axial face 40 of the link 24. The serrations of the serrated axial face 50 and the serrated axial face 40 permit the stem 26 to be fixed to the link 24 in a discrete number of angular orientations (thereby also establishing an angular position of the keyway relative to the link 24) upon securing the stem 26 to the link 24. Moreover, the serrations can prevent the stem 26 (and its keyway 54) from rotating relative to the link 24, which may be more probable if the serrated surfaces were replaced by planar non-serrated surfaces.

When joined, the protrusion 38 on the link 24 and the stem 26 collectively define a shaft of the fixable portion 14 which defines the axis of rotation A-A. However, in some instances, the stem 26 alone may provide the shaft such as, if the serrations on the link are on or recessed in the face of the rotatable portion-facing side 34. In any event, by the disclosed structure, a fixable portion 14 having a shaft with the keyway 54 is provided in which the keyway 54 may assume and be fixed at various angular orientations, regardless of how the fixable portion 14 is mounted to a cane or other chair part.

Although it is contemplated that the stem 26 and link 24 may be connected in various ways, in the illustrated embodiment, the interconnecting tube 28 may be received in the volume between the serrated axial face 40 of the stem 26 and in the opening 42 of the link 26. This interconnecting tube 28 has a radially outward facing surface 56 with helical serrations and a radially inward facing surface 58 with threads.

Turning now to the parts of the rotatable portion 16 of the support bracket 10, the rotatable portion 16 includes the bracket body 20, a depressible button 60 pivotally connected to the bracket body 20 by a pin 62, and a linearly translatable key subassembly including a key member 64, a post 66, a spring 68, and a spring collar 70.

The bracket body 20 will first be described in detail with reference to FIG. 2B and FIGS. 3A through 3C, as the bracket body 20 largely serves as a nexus point for how the other parts are connected. The bracket body 20 has a number of openings and cavities extending through it. In the illustrated body, there are three major passageways formed in the bracket body.

Figure 3A:
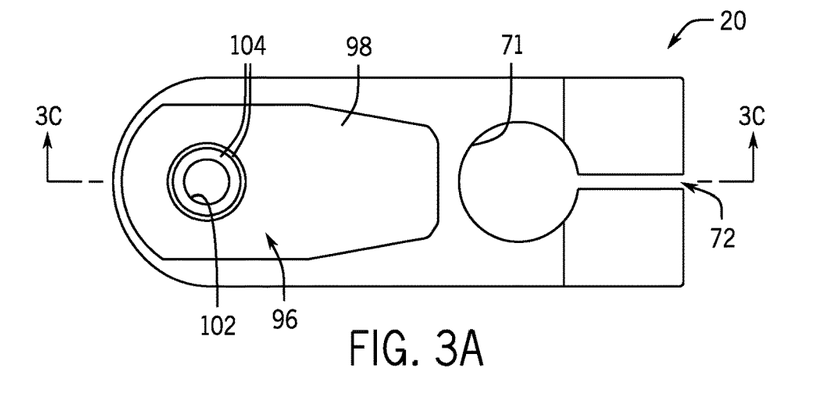
FIGS. 3A, 3B, and 3C are respective top, bottom, and side cross-sectional views of the bracket body.
Figure 3B:
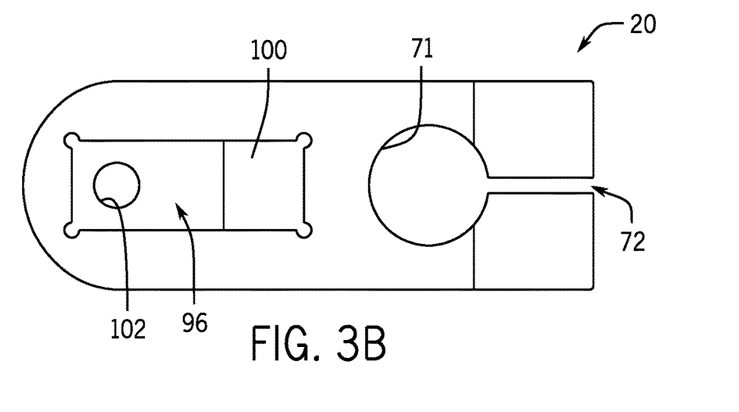
Figure 3C:
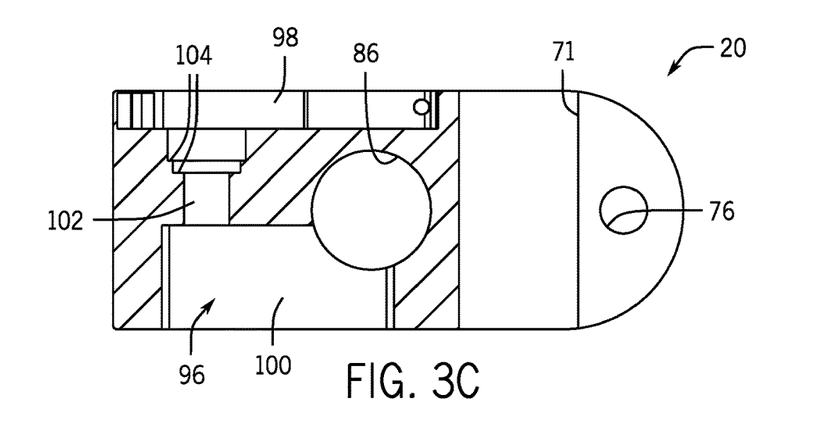

The first of these passageways is a support opening 71 which is adapted for fixed reception of a pad subassembly 22. In the form illustrated, this support opening 71 is a generally cylindrical opening extending from a top face to a bottom face of the bracket body 20. To permit a clamping action to secure the pad subassembly 22 in place, the bracket body 20 includes a split 72 adjacent to the support opening 71 to establish a pair of split sections. One of the split sections includes a counter-bored opening 74 and the other of the split sections includes a threaded hole 76. A fastener may be received through the counter-bored opening 74, through the split 72, and into the threaded hole 76. By tightening down the fastener, the split sections may be drawn closer together to reduce the periphery of the support opening 71. For example, in the illustrated embodiment, the average diameter of the support opening can be reduced by drawing the split sections closer together or increased by permitting split sections to move back away from one another.

With brief reference back to FIGS. 1A and 1B, the pad subassembly 22 includes a stick-like arm 78 which extends upward to a pad bracket 80 which supports a pad 82, which is designed to contact and support a portion of the user's body such as, for example, a knee or leg. During assembly and adjustment, the non-pad supporting end of the arm 72 of the pad subassembly 22 is received in the support opening 71 and positioned at the desired location, the user may then tighten down the fastener 84 to close the periphery of the support opening around the arm 78.

Returning now to the description of the passageways in the bracket body 20, the second of these three passageways is a side-to-side opening 86 that extends laterally through the bracket body 20. This opening 86 receives the shaft of the fixable portion 14 (which in the illustrated form is primarily the stem 26) and includes counter-bored surface 88 on the side not receiving the shaft. A fastener head 90 with a radially extending step 92 is received on this side that is threadably connected to a threaded pin 94. The fastener head 90 and the threaded pin 94 may be secured to one another as well as the threads of the radially inward facing surface 58 of the threaded insert 28 such that the stem 26 of the shaft is axially captured between the fastener head 90 and the threaded insert 28 of the link 24.

The third passageway is a cavity 96 that extends from the top face to the bottom face of the bracket body 20. However unlike the support opening 71, this cavity 96 has a more complex shape. Extending downwardly into the top face of the bracket body 20, the cavity 96 includes an upper recessed section 98 having a periphery that generally matches the shape of the depressible button 60. Extending upwardly from the bottom face of the bracket body 20, the cavity 96 includes a lower recessed section 100 having a periphery that generally matches the shape of the key member 64 (except that there are small circular cutouts at the corner edges). Notably, the forward end of the lower recessed section 100 intersects the side-to-side opening 86 that includes the shaft such that, as will be described in greater detail below, the key member 64 may selectively engage keyway 54 of the shaft. An axially connecting portion 102 of the cavity 96 connects the upper recessed section 98 and the lower recessed section 100. The axially connecting portion 102 also includes a set of counter-bored surfaces 104.

The parts of the linearly translatable key subassembly (including a key member 64, a post 66, a spring 68, and a spring collar 70) will now be described in further detail and it will be subsequently explained how these components are assembled in the bracket body 20.

With reference to FIG. 2B and FIGS. 5A through 5C, the key member 64 is generally rectangular shaped. On a rearward end of the key member 64, there is an axially extending threaded hole 106. On the forward end of the key member 64, there is a section removed from the rectangular shape such that there is an L-shaped segment including a forwardly extending neck 108 and an upwardly extending key 110. Notably, the key 110 is itself rectangular in shape when it is viewed from above, has a rectangular profile as it extends upwardly from the neck 108.

The post 66 is bolt-like, including a generally cylindrical body 112 with a head 114 at an upper end thereof and a threaded section 116 at a lower end thereof.

The spring 68 may be a simple coil spring (although other spring elements may also be used) and a spring collar 70 is an annularly-shaped body having an axially extending circumference 118 and a radially extending lip 120. The spring 68 is sized to have one end of the spring 68 received at the spring collar 70 such that at least some portion of the spring collar 70 can serve as a stop surface.

The linearly translatable key subassembly is assembled in the bracket body 20 in the following manner. The key member 64 is received into the lower recessed section 100 of the cavity 96. This insertion occurs with the key 110 of the key member 64 oriented to face the side-to-side opening 86 (since the key 110 will selectively engage the keyway 54 of the shaft/stem 26). The spring collar 70 may be inserted onto the post 66 such that the upper side of the lip 120 may contact the lower side of the head 114 of the post 66. The spring 68 may be inserted on the post 66 or into an upper end of the axially connecting portion 102 above one of the counter-bored surfaces 104. It is contemplated that, in some forms, the collar might be omitted and the spring might directly engage the post. In any event, in the illustrated embodiment, the post 66 with the collar 70 (and possibly spring 68) received thereon is inserted through the axially connecting portion 102 from the upper recessed section 98 such that the threaded section 116 of the post 66 extends into the lower recessed section 98 of the cavity 96. The threaded section 116 of the post 66 is screwed into the threaded hole 106 of the key member 64 such that the two are joined together and the linearly translatable key subassembly is secured in the cavity 96 of the bracket body 20.

Figure 5A:
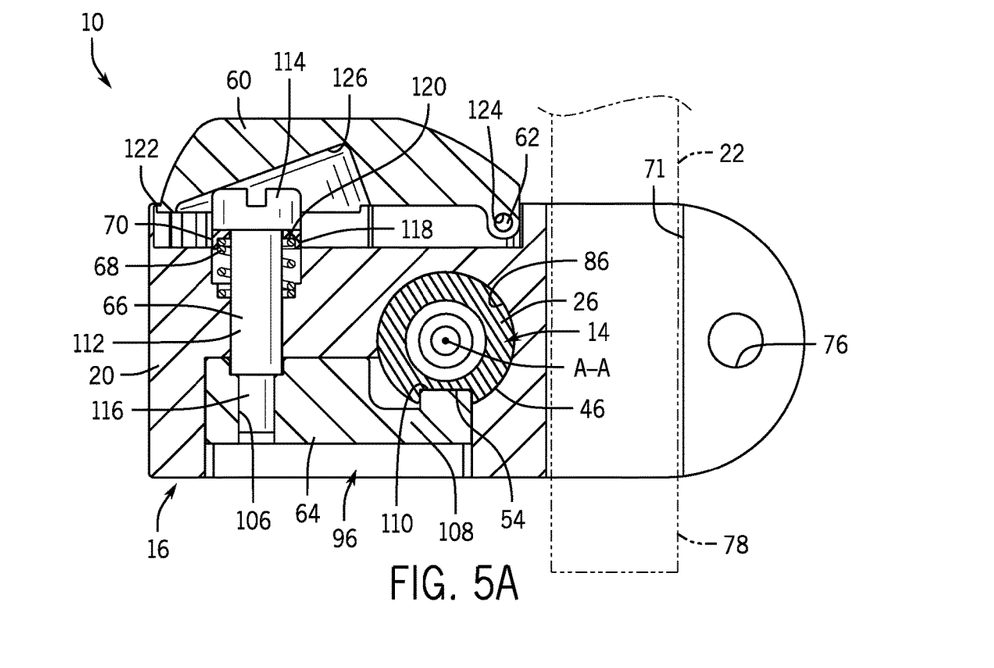
FIGS. 5A, 5B, and 5C are respective side cross sectional views of the support assembly in which the key is in the engaged position, in which the key is in the disengaged position but in which the rotatable portion of the bracket has not yet been rotated relative to the fixable portion, and in which the key is in the disengaged position and the rotatable portion has been rotated relative to the fixable portion.

Notably, in this configuration the spring 68 is under compression between the bottom of the head 114 of the post 66 and at least one of the counter bored surfaces 104 in the bracket body 20, thereby biasing the key member 64 to the lifted or upward position of FIG. 5A. However, upon the downward displacement of the post 66, the key member 64 and the key 110 thereon, can be temporarily moved downward as is depicted in FIG. 5B.

Figure 4:
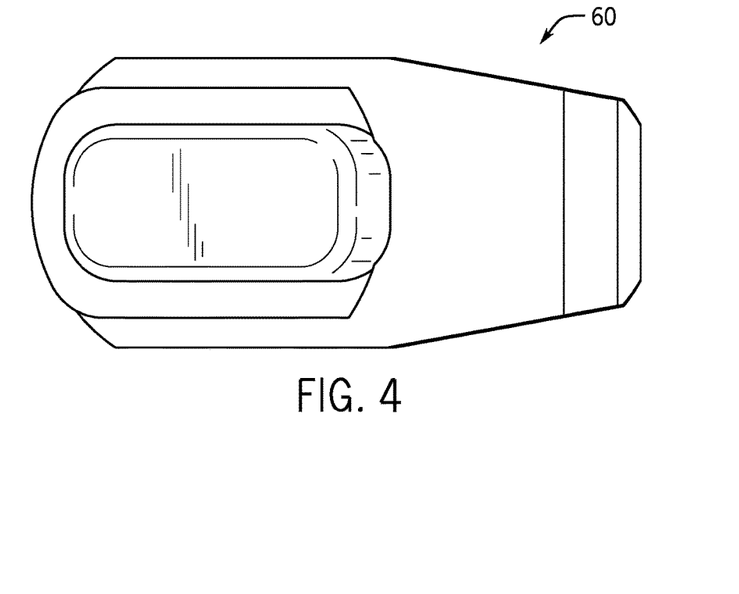
FIG. 4 is a bottom view of the depressible button which is attached to the bracket body.

In the disclosed device, the downward displacement of the key member 64 is actuated by the depression of the depressible button 60. The depressible button 60 is best illustrated in FIGS. 2B and 4. The depressible button 60 is designed to be pivotable about an axis of rotation established by a pin 62 that extends through an opening 124 on one end of the depressible button 60. On the end of the depressible button 60 not having the opening 124, there is a tab 122 (best shown in FIGS. 5A through 5C) which engages a ledge on the bracket body 20 to prevent the depressible button 60 from swinging away from the bracket body 20.

As can be best seen in FIGS. 2B, 4, and 5A through 5C, the underside of the depressible button 60 has a contacting surface 126 that is oblique to the central axis of the post 66. When the button 60 is depressed, this contacting surface 126 engages the head 114 of the post 66 to move the post 66 and the entire linearly translatable key subassembly downward against the biasing force of the spring 68, thereby displacing the key 110 downward and out of the side-to-side opening 86. It has been found that having an angled or oblique contacting surface 126 with this type of button 60 prevents the post 66 from sticking as it translates downward.

Figure 5B:
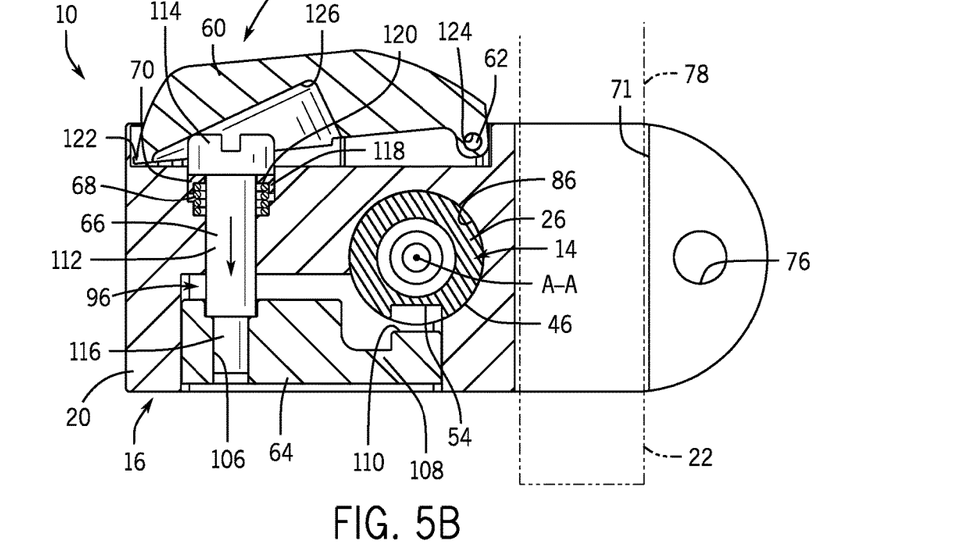
Figure 5C:
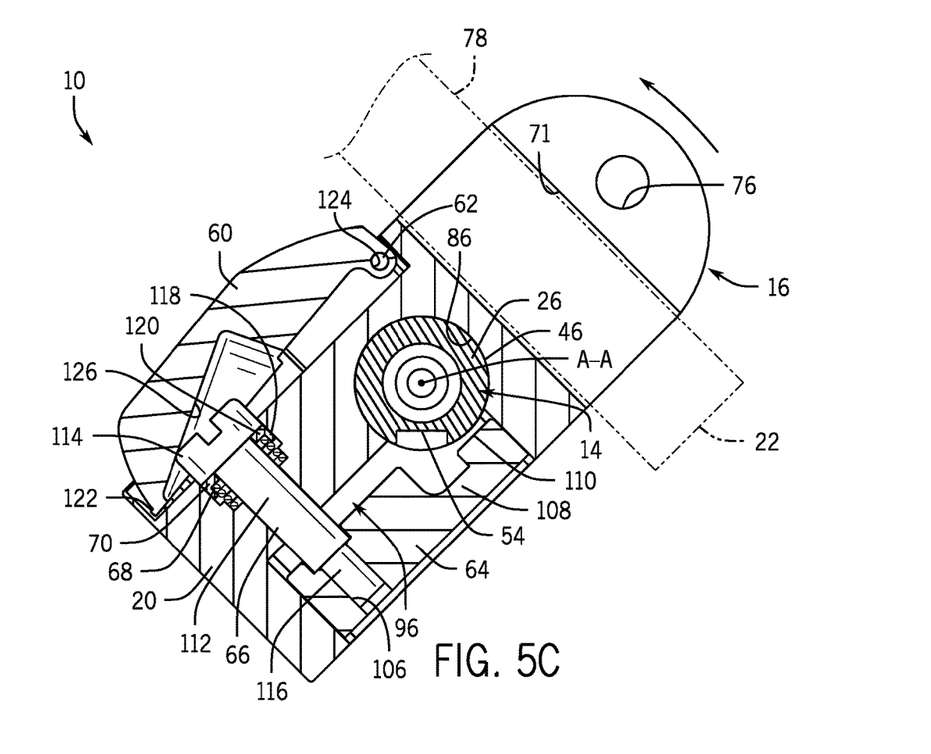

Turning now to FIGS. 5A through 5C, cross sections of the bracket portion of the assembly are illustrated in locked, unlocked, and unlocked and rotated positions, respectively, to clearly illustrate the manner of usage of the support assembly.

Looking first at FIG. 5A, the linearly translatable key subassembly is shown in the position in which the spring 68 biases the subassembly upward such that the key member 64 and key 110 are in the engaged position in which the key 110 is received in the keyway 54 of the shaft/stem 26. In this position, the rotatable portion 16 of the support assembly 10 is fixed relative to the fixable portion 14 of the support assembly 10. It should be appreciated that because the stem 26 may be angularly adjustable relative to the link 24 at the serrated faces, the relative positions of the link 24 to the bracket body 20 may be altered depending on the particular arrangement.

To release the rotatable portion 16, the operator presses the button 60 downward as depicted in FIG. 5B. Upon depressing the button 60, the button 60 pivots about the pin 62 such that contacting surface 126 bears on the head 114 of the post 66 moving it axially downward in the cavity 96 against the biasing force of the spring 68. This notably causes the translation of the key member 64 and the key 110 to be moved to a disengaged position (shown in both FIGS. 5B and 5C) in which the key 110 is withdrawn from the keyway 54 of the shaft/stem 26. If, in the orientation of the rotatable portion 16 relative to the fixable portion 14, the button 60 is released, the linearly translatable key subassembly would shift back upward due to the biasing force of the spring and the key 110 would re-enter the keyway 54.

However, with the button 60 depressed, the rotatable portion 16 may be rotated relative to the fixable portion 14 from the position illustrated in FIG. 5B to, for example, the position illustrated in FIG. 5C. More specifically, with the key 110 disengaged from the keyway 54, the bracket body 20 and the attached pad subassembly 22 may be rotated relative to the shaft/stem 26 of the fixable portion 14 about the axis A-A, since the key member 64 no longer locks the rotation of the rotatable portion 16 relative to the fixable portion 14. During such rotation, the bracket body 20 is rotatable about a single plane of rotation which is perpendicular to the axis of rotation A-A defined by the shaft of the fixable portion 14.

Also, it should be noted that once the key 110 is rotated relative to the keyway 54, then releasing the button 60 will not result in the key 110 re-entering the keyway 54 until and unless the key 110 and keyway 54 are again angularly re-aligned with one another. With this construction, it is possible that the operator may effectively operate the support assembly 10 with only a single hand, pressing the button and rotating the rotatable portion 16 relative to the fixable portion to swing the pad subassembly 22 out of the way during loading/unloading of a user into the wheelchair and then rotating the rotatable portion 16 back into the position in which the key 110 re-engages the keyway 54. Also note that the rectangular shape of the key 110 can result in a vocal and/or tactile snap of the key 110 back into the keyway 54 to alert the user to the fact that the rotatable portion 16 is again fixed relative to the fixable portion 14.

Thus, an improved support assembly is provided that permits for the pad and any associated arm to be temporarily swung out of the way and then precisely returned to its original position at a later time. Among other things, the structure disclosed herein may provide one-handed release and rotation while still permitting a return to the originally selected pre-configured fixed configuration.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A support assembly for a wheelchair, the support assembly comprising:
    a fixable portion adapted to be fixedly mounted to the wheelchair, the fixable portion including:
        at least one mount adapted to be mounted to the wheelchair; and
        a shaft having a keyway formed therein, the shaft being supportable by the at least one mount; and
    a rotatable portion received on the shaft of the fixable portion and being in selective locked engagement therewith, the rotatable portion including:
        a bracket body defining an opening into which the shaft of the fixable portion is received; and
        a key member providing a key, the key member being supported by the bracket body and movable in linear translation between an engaged position in which the key is engaged with the keyway in the shaft to lock an orientation of the bracket body of the rotatable portion relative to the shaft of the fixable portion and a disengaged position in which the key is disengaged from the keyway in the shaft to permit the rotatable portion to rotate relative to the fixable portion about an axis of rotation defined by the shaft
    wherein the bracket body includes a cavity extending from one side to the other side of the bracket body in which the key member is received, the cavity of the bracket body being in communication with the opening in the bracket body in which the shaft is received such that the key of the key member is engageable with the keyway in the shaft in at least one orientation of the rotatable portion relative to the fixable portion;
    wherein the rotatable portion further comprises a post connected to the key member, a biasing element that is interposed between the post and the bracket body to bias the key member to the engaged position, and a depressible button connected to the bracket body that is positioned to contact the post and, upon depression of the depressible button overcome the biasing force of the biasing element to move the key member to the disengaged position.

2. The support assembly of claim 1, wherein, in the disengaged position in which the key is disengaged from the keyway in the shaft to permit the rotatable portion to rotate relative to the fixable portion about an axis of rotation defined by the shaft, the bracket body is rotatable about a single plane of rotation which is perpendicular to the axis of rotation defined by the shaft of the fixable portion.

3. The support assembly of claim 1, wherein an underside of the depressible button includes a recess formed therein adapted for contact with a head of the post.

4. The support assembly of claim 3, wherein the recess in the underside of the depressible button includes a contacting surface that is oblique to the central axis of the post.

5. The support assembly of claim 1, wherein the key is rectangular in shape.

6. The support assembly of claim 1, wherein the key member is linearly translatable within the cavity of the bracket body between the engaged position and the disengaged position and wherein the cavity includes at least a portion thereof that is shaped to be adapted to define a path of linear translation of the key member in the cavity.

7. The support assembly of claim 6, wherein the key member has a rectangular periphery and the cavity has a portion with a corresponding rectangular periphery for reception of the key member in which the corresponding rectangular periphery on the cavity further includes cutout sections at each of the corner edges of the corresponding rectangular periphery to provide dimensional relief and inhibit binding of the key member in the cavity.

8. The support assembly of claim 1, wherein the key extends from the key member in a direction opposite a direction of movement from the engaged position of the key member to the disengaged position of the key member.

9. The support assembly of claim 1, wherein the fixable portion further comprises a link to which the at least one mount is attached and further comprises a stem which is attached to the link, the stem defining, at least in part, the shaft and the keyway.

10. The support assembly of claim 9, wherein the stem and the link each include a respective serrated face that mate with one another to define a plurality of pre-defined angular orientations of the stem and the keyway relative to the link.

11. The support assembly of claim 10, wherein the serrated face on the stem is positioned on an axial end thereof.

12. The support assembly of claim 10, wherein the fixable portion further comprises a threaded insert that is press fit into an opening of the link in which the opening is centrally disposed relative to an annular serrated face on the link.

13. The support assembly of claim 10, further wherein the fixable portion further comprising at least one fastener element that secures the stem to the link.

14. The support assembly of claim 1, wherein the bracket body further comprises a support opening for fixed reception of a pad subassembly in the bracket body.

15. The support assembly of claim 14, wherein the bracket body contains a split section adjacent to the support opening, the split section having two sections that may be drawn together using a fastening element to selectively reduce a size of the support opening.

16. The support assembly of claim 14, wherein the support assembly further comprises the pad subassembly which comprises an arm sized to be received in the support opening on one end thereof and a pad supported on the other end thereof.

17. The support assembly of claim 1, wherein the support assembly is a knee adductor.

18. The support assembly of claim 1, wherein a radially outward facing surface of the shaft bears directly on a radially inward facing surface of the opening of the bracket body into which the shaft is received.

* * * * *